United States Patent [19]
Harrison

[11] 3,754,809
[45] Aug. 28, 1973

[54] MICROSCOPE
[75] Inventor: Burton H. Harrison, Weston, Mass.
[73] Assignee: Selective Educational Equipment, Inc., Newton, Mass.
[22] Filed: Feb. 3, 1972
[21] Appl. No.: 223,120

[52] U.S. Cl................ 350/87, 350/84, 350/236, 350/238, 200/85 R
[51] Int. Cl. .......................................... G02b 21/06
[58] Field of Search................... 350/87, 84, 236, 350/238; 200/85 R

[56] References Cited
UNITED STATES PATENTS
| | | | |
|---|---|---|---|
| 2,329,897 | 9/1943 | Heinicke | 350/87 |
| 3,360,641 | 12/1967 | Korte | 350/87 X |
| 2,437,809 | 3/1948 | Engelbrecht | 200/85 R |
| 2,812,422 | 11/1957 | Provi | 200/85 R |
| 3,348,006 | 10/1967 | Brand | 200/85 R |
| 3,649,097 | 3/1972 | Davidson et al. | 350/84 |

*Primary Examiner*—David H. Rubin
*Attorney*—Wolf, Greenfield & Sacks

[57] ABSTRACT

A microscope including a base and a support arm extending upwardly from the base and projecting over a portion of the base. A lens carrier is positioned on and movable with reference to the support arm, and includes lens receiving means. A cam means is provided to raise and lower the lens carrier.

The microscope also includes a mirror, a bulb positioned adjacent to the mirror, a battery, and a pushbutton switch. The pushbutton switch is arranged to protrude in part below the bottom surface of the base and is closed to illuminate the bulb when the edge of the microscope base is depressed to a position flush with the supporting surface.

6 Claims, 6 Drawing Figures

3,754,809
PATENTED AUG 28 1973
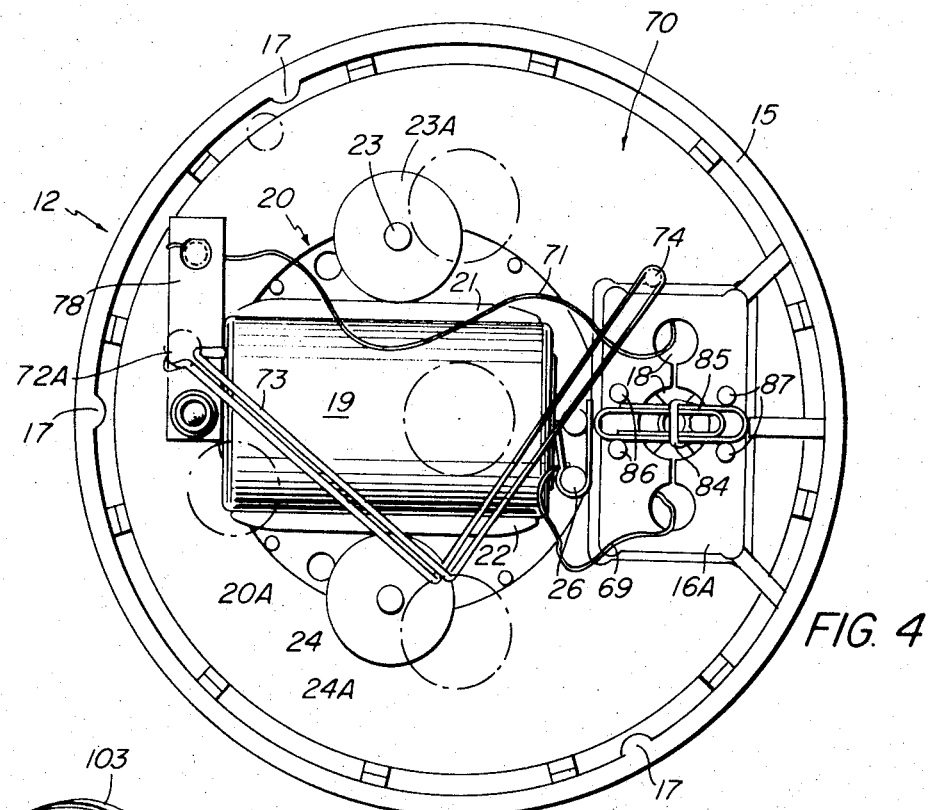
FIG. 4
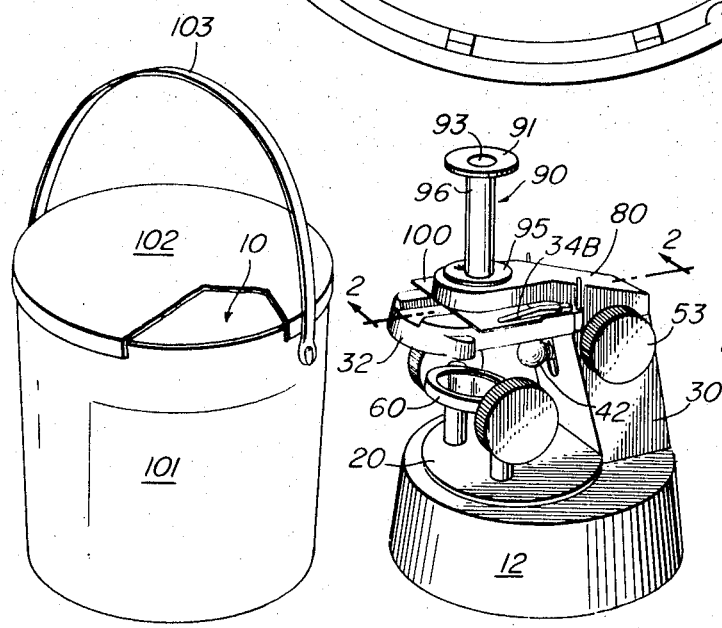
FIG. 6
FIG. 1

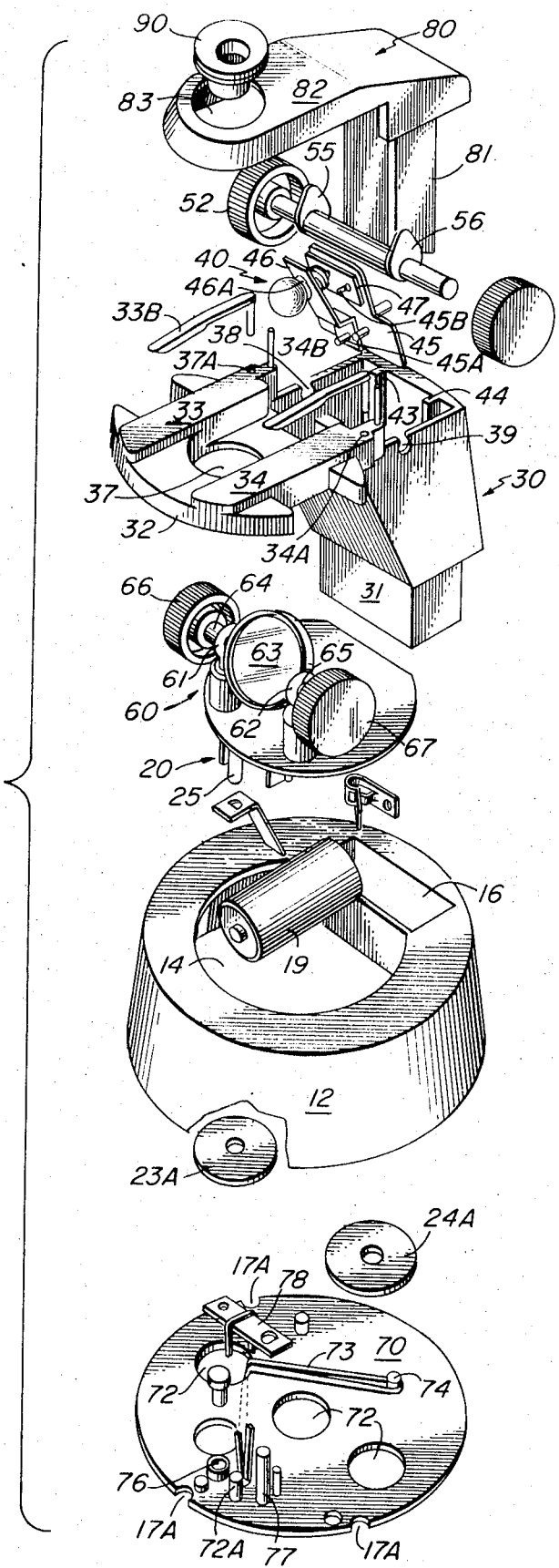

MICROSCOPE

BACKGROUND OF THE INVENTION

The present invention relates to a microscope, and in particular to a battery operated microscope preferably fabricated of easily assembled plastic pieces.

Most microscopes have been designed as precision instruments and therefore are expensive and delicate. Some microscopes have bulbs that are battery operated. The switching arrangements are such that the operator of the microscope may often forget to turn off the bulb. This is especially troublesome because the microscope is usually used in the daylight and thus the illuminated bulb is not easily discernible. Therefore, the switch can be left on and the battery can be de-energized quite easily.

SUMMARY OF THE INVENTION

It is an object of the present inventor to provide an improved microscope which is designed for use by young students. The microscope is of inexpensive rugged construction and is designed for simple assembly by a student in a manner which assists in understanding its construction and function. In this connection the microscope provides an accurate yet simple means for adjusting the lens relative to the specimen being observed.

Accordingly, one important object of the present invention is to provide a microscope that is preferably battery operated and includes a switch means that automatically opens when the microscope is left unattended.

Another object of the present invention is to provide a microscope including a lens and having means for accurately focusing the lens relative to the specimen being observed.

A further object of the present invention is to provide a battery operated microscope that is relatively inexpensive, that is preferably fabricated of plastic, and may be quickly assembled.

Still another object of the present invention is to provide a container for the microscope that may be used to both hold the unassembled components of the microscope and the assembled microscope.

According to the invention, the microscope comprises a base, a lens positioned above the base, a mirror positioned intermediate the base and the lens, a light source positioned adjacent to the mirror, and an energy source coupled to and capable of illuminating the light source. According to one aspect of the invention switch means are coupled between the energy source and the light source which are adapted to be in either an open or a closed condition. The switch means extends at least in part below a bottom edge of the base and the microscope would be so designed that its weight alone would be insufficient to cause the switch means to close. Therefore, when the microscope is left unattended the switch is left open and the battery is not being drained.

According to another aspect of the invention, the microscope comprises a support member extending from the base and projecting over a portion of the base, and lens receiving means coupled to the support member and also projecting preferably over a like portion of the base. Cam means are provided positioned intermediate the support member and lens receiving means for varying the distance between the support member and the lens receiving means to focus the observed specimen.

A novel container is also provided for the microscope of the invention. This container may be used for the component parts of the microscope before it has been assembled, and can also be used to carry the assembled microscope. The container is preferably provided with a handle and fabricated of plastic.

Numerous other objects features and advantages of the invention will now become apparent upon a reading of the following detailed description in conjunction with the drawings which:

BRIEF DESCRIPTION OF THE DRAWINGS

FIG. 1 is a perspective view of a microscope constructed in accordance with the principles of the present invention.

FIG. 4 is a bottom view of the microscope showing the transparent switch plate in position.

FIG. 5 is an exploded view of a microscope constructed in accordance with the principles of this invention.

FIG. 6 is a perspective view of the container for the microscope.

DETAILED DESCRIPTION

Figure 2:
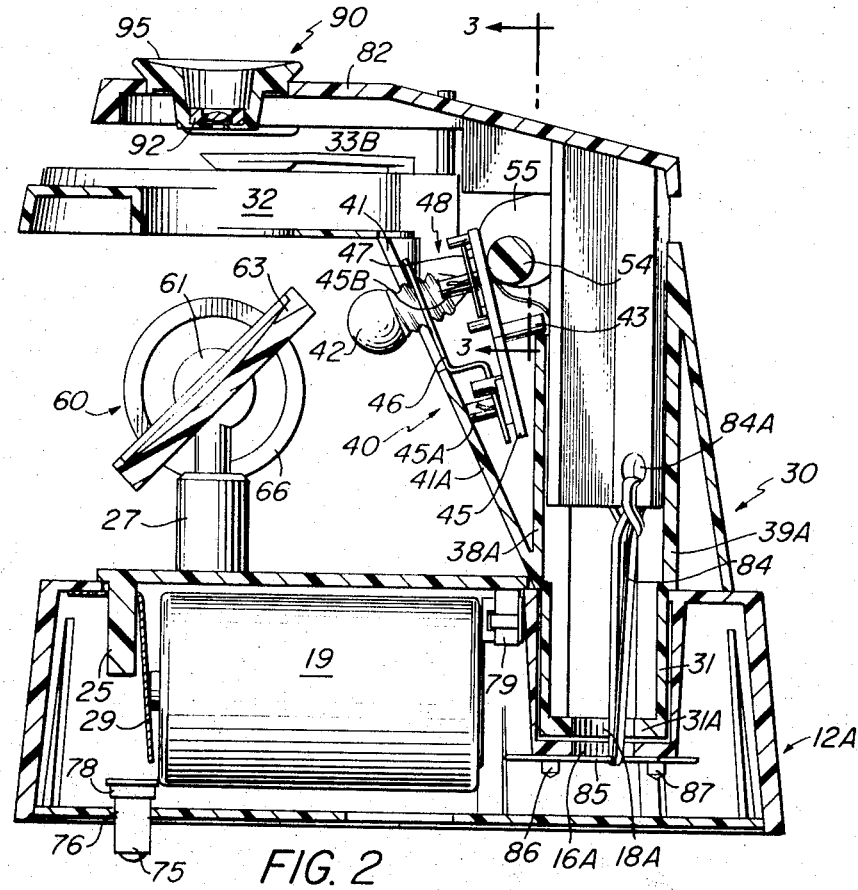
FIG. 2 is a cross-sectional view taken along line 2—2 of FIG. 1.

Referring now to FIG. 1 there is shown a perspective view of a microscope 10 constructed in accordance with the principles of this invention. Microscope 10 includes a plastic base 12 and support member 30 which extends upwardly from base 12. Support member 30 includes horizontal extension 32 upon which a slide 100 may rest. Slide 100 may have the specimen to be observed placed thereon. A lens carrier 80 is positioned above horizontal extension 32 of support member 30 and includes means for receiving lens assembly 90. The support member 30 includes an inner compartment for holding bulb 42. FIG. 1 also shows one of the adjusting knobs 53 of focus assembly 50. Mirror assembly 60 is positioned above battery holder 20 with bulb 42 positioned adjacent to assembly 60. Battery holder 20 includes means protruding into base 12 for holding a battery.

Referring now to FIGS. 2–6 the base is preferably fabricated of plastic and includes a substantially circular opening 14 for accommodating battery holder 20. Base 12 also includes a downwardly extending slot 16 which forms a cavity into which the rectangular neck 31 of support member 30 may be urged. The bottom wall 16A of slot 16, shown in FIG. 4, has three holes 18 which align with similarly placed holes 18A, in bottom wall 31A of neck 31. Insulated wires 69 and 71 pass through these holes 18 and connect between bulb 42 and battery 19.

The bottom view of FIG. 4 shows a bottom edge 15 of base 12. When the microscope is in use edge 15 is usually touching the surface upon which the microscope is placed. Bottom edge 15 is provided with three inwardly protruding curved tabs 17 which mate with three spaced notches 17A of transparent switch plate 70 (See FIG. 5).

Support member 30 (See FIGS. 2 and 5) includes in addition to neck 31, horizontal extension 32 which extends over base 12. Horizontal extension 32 includes spaced flat surfaces 33 and 34 over which a slide 100 may be positioned. Holes 33A and 34A, are provided in surfaces 33 and 34 for accommodating slide clips 33B and 34B, respectively. Slide clips 33B and 34B are provided to hold slide 100 in position (see FIG. 1). A hole 37 passes through extension 32 between surfaces 33 and 34 and provides an unobstructed optical path from the lens assembly 90 to the mirror assembly 60. Support member 30 also includes upwardly extending guide posts 35 and 36 which laterally guide lens carrier 80 when it is in position directly above horizontal extension 32 (see FIG. 3). The inside of support 30 is hollow and includes vertically extending ridges 43 and 44 (See FIG. 5) for guiding mating base 81 of the lens carrier 80 into support member 30. Referring to FIG. 2 there are shown walls 38A and 39A defined in support member 30 for aligning mating base 81 vertically. Support member 30 also defines a compartment 48 (see FIG. 2) into which bulb holder 40 is inserted. Bulb 42 protrudes through recess 41 in wall 41A which defines part of compartment 48, and is positioned adjacent mirror 63.

The mating base 81 of lens carrier 80 includes four spaced wings that insert between walls 38A and 39A of support member 30 and are guided by ribs 43 and 44. Lens carrier 80 also includes a horizontal lens receiving arm 82 having a hole 83 therein for accommodating lens assembly 90. Lens carrier 80 is held within support member 30 by means of elastic 84 which ties from one or more holes 84A in the bottom portion of mating base 81 and extends around paper clip 85 which bridges between post pairs 86 and 87 projecting from surface 16A of base 12 (See FIGS. 2 and 4). The elastic 84 preferably extends through the middle aligned holes 18, 18A and is adapted to hold lens carrier 80 in a normally tensioned downward position.

The focus assembly 50 is provided between lens carrier 80 and support member 30 to adjust the vertical position of lens carrier 80 to thereby focus the specimen being observed on slide 100. Focus assembly 50 includes a pair of adjusting knobs 52 and 53 which fit upon opposite ends of shaft 54. Cams 55 and 56 are spaced intermediate knobs 52 and 53, as shown. The spacing between cams 55 and 56 is about the same as the width w of horizontal lens receiving arm 82 (See FIG. 3). Shaft 54 of focus assembly 50 fits within recesses 38 and 39 of support 30 and is adapted to be rotated by knobs 52 and 53 to cause cams 55 and 56 to urge lens carrier 80 up and down.

Figure 3:
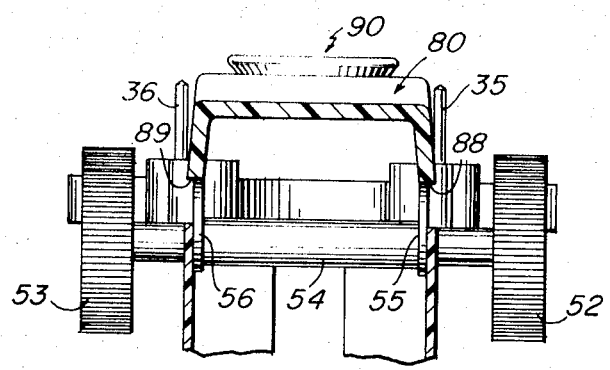
FIG. 3 is a fragmentary cross-sectional view taken along line 3—3 of FIG. 2, showing the cam assembly.

FIG. 3 is a fragmentary view of the focus assembly 50 showing cams 55 and 56 urging the lens carrier assembly 80 upwardly. Lens carrier assembly 80 includes downwardly extending bottom surfaces 88 and 89 which function as cam followers for cams 55 and 56, respectively. Mirror assembly 60 is positioned below horizontal extension 32 and arm 82, with circular mirror 63 aligned below holes 37 and 83, respectively. Circular mirror 63 has shafts 64 and 65 extending horizontally from either side. These shafts 64 and 65 fit in holes in eyelets 61 and 62, respectively which forms an integral part of battery holder 20.

Battery holder 20 fits within passage 14 in base 12 and is adapted to hold a battery 19 between spaced ribs 21 and 22 which extends from the top flat portion 20A of holder 20. Battery 19 may be a conventional D-cell which is force fitted between ribs 21 and 22. Contact clip 29 and Fahnestock clip 79 also aid in holding battery 19 in position and provide the electrical contact for the battery. Clip 29 is bent as shown in FIGS. 2 and 5, and fits about plastic terminal post 25 which extends down from top portion 20A of holder 20. Fahnestock clip 79 also fits about a plastic terminal post 26 which also extends from portion 20. Wire 69 conventionally connects from clip 79 to one terminal of bulb 42. Securing posts 23 and 24 and their respective washers 23A and 24A, which insert over securing posts 23 and 24 hold battery holder 20 in place. As previously mentioned the bulb holder 40 is inserted in bulb holder compartment 48 defined in support member 30. Bulb holder 40 comprises a plastic base 45 (See FIGS. 2 and 5) having posts 45A and 45B protruding therefrom for holding respective contacts 46 and 47. Contact 46 has a hole 46A therein for accommodating bulb 42 which is screwed in hole 46A and has its center contact touching contact 47. Contacts 46 and 47 are obviously isolated from each other and have respective wires 69 and 71 connected thereto. The wire contact can be made by forcing each contact over its respective post with the wire therebetween. Shoulder 43 extends from base 45 and acts as a stop to limit the downward position of holder 40.

The switch means of the present invention is coupled through switch plate 70 which is transparent (See FIGS. 4 and 5). Switch plate 70 has a plurality of holes 72 one of which has elastic 73 extending therethrough. One end of elastic 73 couples around post 74 and the other end extends through a smaller hole 72A and upwardly about conductive contact 78. Contact 78 fits about post 77 at one end and extends over hole 76. Hole 76 is provided to accommodate push button 75 which has an enlarged upper portion which will not extend through hole 76. Wire 71 is held between post 77 and contact 78.

Referring to FIG. 4, elastic 73 is adapted to pull conductive contact 78 downward and away from clip 29 (See FIG.2). Thus the circuit between the bulb 42 and battery 19 is open even when the microscope is placed on a flat surface. To close the circuit and illuminate bulb 42 the microscope is depressed to a flat position. This depresses push button 75 inside base 12 and closes the circuit through clip 29 and contact 78. The tension of elastic 73 can be readily changed by providing other posts 74 at different positions, or by extending the elastic through another hole 72. The tension should, however, be great enough so that the contact between clip 29 and contact 78 opens when the microscope is left unattended. By using plastic components for most of the microscope its weight is to light to close the circuit between battery 19 and bulb 42.

An assembled lens assembly 90 that fits within hole 83 is shown in FIG. 1. Assembly 90 include a lens holder 95, hollow tube 96, and eyepiece 91. Lens holder 95 in one embodiment conventionally contained a 60 X lens 92 (See FIG. 2) while eyepiece 91 conventionally contained a double convex lens 93.

Referring now to FIG. 6 there is shown a bucket container 101 that may be used to hold the unassembled parts of the microscope and also the assembled microscope. Bucket 101 is provided with a fitted cover 102 and carrying strap 103.

What is claimed is:
1. A microscope comprising:
a base having means defining a top and bottom opening, a support member including a generally vertical neck extending from said base adjacent to top opening therein and a generally horizontal arm projecting over the top opening in the base and having a hole therethrough, a lens assembly fitted within the hole in the horizontal arm and including a lens, lens holder and eyepiece, a disc-shaped holder fitted within and covering the top opening in the base, said disc-shaped holder having means extending downwardly from a bottom surface thereof for holding said battery, a mirror, means for rotating said mirror into different planes, said disc-shaped holder having means extending upwardly from a top surface thereof for supporting said mirror and said means for rotating said mirror, a light bulb, conductor wires coupling between said battery and light bulb, said support member including means defining an aperture through which said bulb extends, a plate covering the bottom opening in the base, a switch means coupled between said battery and bulb for controlling illumination of said bulb.

and means for downwardly biasing said switch means with at least a portion thereof extending below said plate, said portion of said switch means disposed near an outer edge of said base, wherein said microscope has a weight that is insufficient to cause said switch means to close.

2. The microscope of claim 1 wherein said switch means is positioned below said battery at an end thereof and includes a conductive tab means adapted to electrically contact one terminal of the battery when said switch means is closed.

3. The microscope of claim 2 wherein said switch means comprises means for pivotally securing said tab means at one end to a top surface of said plate, said portion of said switch means including a pushbutton passing through an opening in the plate and touching said tab means at its other end.

4. The microscope of claim 2 wherein said switch means comprises means for pivotally securing said tab means at one end to a top surface of said plate, said portion of said switch means including a pushbutton passing through an opening in the plate and touching said tab means at its other end.

5. A microscope comprising;

a base having means defining a top and a bottom opening, a support member including a generally vertical neck extending from said base adjacent the top opening therein and a generally horizontal extension projecting over the top opening in the base and having a hole therethrough, a lens carrier including a generally vertical base mating with a top opening in the neck of said support member, and an arm extending over the horizontal extension and having a hole in alignment with the hole in the horizontal extension, said horizontal extension having a flat upper surface for receiving a slide and means for maintaining the slide in position, means coupled from said base for forceably holding said vertical base of said lens carrier in the top opening in the neck, means for adjusting said lens carrier relative to said support member, a lens assembly fitted within the hole in the horizontal arm and including a lens, lens holder and eyepiece, a disc-shaped holder fitted within and covering the top opening in the base, a battery, means for securing said battery below said holder and in said base, a light bulb, means for supporting said light bulb with a portion disposed in said support member and an illuminating portion extending through an aperture in a slanted wall defining a part of said support member, conductor wires coupling between said battery and light bulb, a mirror assembly, means for supporting said mirror assembly above said disc-shaped holder, a plate covering the bottom opening in the base, a switch coupled between said battery and bulb for controlling illumination of said bulb and including a pushbutton, and means resiliently supporting said pushbutton below said plate, said plate having a hole for receiving said pushbutton, said microscope having a weight insufficient to cause said switch to close without application of additional downward force.

6. The microscope of claim 5 wherein said disc-shaped holder includes means for supporting said battery therebelow and said mirror assembly thereabove.

* * * * *